Patented July 6, 1937

2,085,966

UNITED STATES PATENT OFFICE 2,085,966

MEANS FOR AND METHOD OF TREATING WATER

Sydney P. Foster and George H. Sill, Chicago, Ill., assignors to The Bird-Archer Co., Chicago, Ill., a corporation of Delaware No Drawing. Application September 15, 1934, Serial No. 744,170

7 Claims. (Cl. 210—23)

This invention relates in general to a process and product to be used in the treatment of water.

It is often necessary to subject water which is to be used for commercial as well as for drinking purposes to various purifying treatments in order to remove suspended solid matter and various chemical compounds in solution. These soluble chemical compounds are roughly of two classes, those which constitute what is called the permanent hardness of water, and those which constitute what is called the temporary hardness of water. For commercial purposes, especially, it is important not only to remove the suspended solid matter, but also to destroy the "hardness" of the water, because ordinary hard water creates various deleterious results and effects, as for instance boiler scale.

Our invention relates more particularly to a medium which, when added to a quantity of hard water containing suspended matter, will operate to remove the suspended solid matter, and at the same time to reduce the temporary and permanent hardness of the water. This we accomplish, as will appear from the following specification, by means of mutually coacting re-agents which, upon being placed in the water to be treated, form a heavy flocculent precipitate which carries down with it the solid suspended matter, and at the same time and as a result of the same reaction releases a quantity of caustic or alkaline substance which reacts with the chemical salts producing the hardness of the water and destroying their properties in this respect, or at least reducing the deleterious effects thereof.

An important object of our invention is to provide a product and method for use in treating water in order to achieve the quick formation of a flocculent precipitate in the water being treated, which precipitate has a high settling rate.

Another object of our invention is to provide for the particularly rapid coagulation of suspended matter from waters containing the same.

Another object of our invention is to provide a method and product for treating water in order to form heavy flocculent precipitates in water for use in boilers, said precipitates being capable of forming and settling in waters having a wide alkalinity range.

Another object of our invention is to provide a method and product for water treatment which will operate in the absence of magnesium salts.

Another object of our invention is to provide a product and method for water treatment which does not reduce the alkalinity of treated water.

In practicing our invention we find that we may use a variety of different substances in various combinations and quantities in order to produce the heavy flocculent water purifying precipitates. We prefer, however, to use aluminum hydroxide and zinc oxide, preferably in alkaline solution, the solution being prepared, preferably, in accordance with the following approximate formula:

|  | Percent by weight |
|---|---|
| Aluminum hydroxide | 16 |
| Zinc oxide | 6 |
| Alkali (preferably caustic soda) | 26 |
| Water | 51 |

When the aluminum hydroxide, zinc oxide and alkali are dissolved in the water and thoroughly mixed a clear liquid solution is produced. This solution in all probability contains a zincate and an aluminate held in solution as a result of the high alkaline condition maintained by the alkali ingredient. This initial solution probably forms somewhat as indicated by the following chemical equation:

$$ZnO + 2Al(OH)_3 + 4NaOH = Na_2ZnO_2 + Na_2Al_2O_4 + 5H_2O$$

When a quantity of this solution is added to a relatively large quantity of water to be treated the alkalinity is reduced as a result of dilution and the zincate and aluminate react to form zinc aluminate and an alkali—assuming that caustic soda is the alkali used in the original solution, the alkali now formed will also be caustic soda. This reaction probably takes place somewhat according to the following chemical equation:

$$Na_2ZnO_2 + Na_2Al_2O_4 + 2H_2O = ZnAl_2O_4 + 4NaOH$$

A heavy flocculent precipitate is formed in the water being treated, which precipitate tends to settle out almost immediately. It is thought that the precipitation is caused by the zinc aluminate. In any event, the precipitate formed is relatively heavy and settles rapidly clearing the water of suspended matter. In the course of this precipitation it is possible that the zinc aluminate may be precipitated as such or break down to form zinc and aluminum hydroxides, respectively, in accordance with a reaction which may be expressed somewhat according to the following chemical equation:

$$ZnAl_2O_4 + 4H_2O = Zn(OH)_2 + 2Al(OH)_3$$

These precipitates comprising zinc and aluminum compounds have relatively great molecular weight and therefore carry down solid suspended matter most efficiently. In addition to this these precipitates in forming seem to have a very pronounced physical structure commonly described as flocculent, and therefore have a further increased coagulating effect. Furthermore, the precipitates seem to have advantageous properties of occlusion and inclusion, whereby the precipitate in forming absorbs or occludes matter carried in the water, and also includes solid particles carried in the water by forming itself around and on such particles.

If, in preparing the solution, we use an excess of aluminum compounds over zinc compounds to such an extent that the aluminum does not all precipitate as zinc aluminate or aluminum hydroxide, there will be some aluminate left in the water after treatment so that if the water is thereafter used, for instance, in a steam boiler, the aluminate will tend to inhibit the production of scales in the boiler and its tubes. Finally, the excess alkali in the original solution, as well as that which is liberated in the intermediate reaction (as suggested by equation number two) which occurs upon the addition of the solution to the water being treated, will tend to counteract the hardness of the water. Other soluble zinc salts such as zinc sulphate or zinc chloride may be substituted for zinc oxide in the foregoing formula. But we prefer to use zinc oxide since this substance does not contain acid forming radicals, as is the case with the sulphate and chloride. The presence of such acid forming radicals in the solution reduces the effective alkalinity and forms sulphates or chlorides in the treated water. While in a great many cases the presence of such sulphate or chloride compounds would not be objectionable, nevertheless, substances of this character ordinarily are not desirable and may be avoided by the use of "basic" zinc compounds rather than "acidic" zinc compounds, as ingredients in the original solution. Furthermore, we have discovered that this solution may be used alone or in conjunction with the various commonly used water softening reagents and processes, such as for instance the lime-soda ash treatment, or the wayside railroad water treatment using only soda ash.

When used as a conjunctive treatment with the conventional lime-soda process, the present method is particularly valuable and such a method forms the preferred embodiment of the present invention. While the lime-soda treatment for removing the hardness of water normally results in considerable residual hardness, the conjunctive treatment, aside from numerous other improved results, almost completely obviates this disadvantage. It is preferred also that, in a mixture of basic zinc and basic aluminum compounds, each of the compounds be present in proportion amounting to more than a mere trace, and particularly that each compound be in excess of about five per cent of the mixture of compounds.

In operation, we add a quantity of our solution to a quantity of water to be treated while stirring continuously. After the solution is added the stirring is continued, preferably about five minutes, whereupon the stirring is stopped quickly, the agitation of the water suppressed as rapidly as possible, and the precipitate begins to settle out toward the bottom of the tank in a flocculent mass, carrying with it as it passes down through the water substantially all the solid suspended matter.

After the settling has taken place to the desired extent, the clear supernatant liquid may be drawn off and either filtered or used directly.

Having fully disclosed our invention and more specifically stated a preferred form of said invention, we do not wish to be limited to the exact procedure above set forth, or to the exact product therein described, as variations may be made therein without departing from the spirit of our invention, the scope of which is commensurate with our claims.

What we claim as new and desire to secure by Letters Patent is:

1. A product for treating water comprising a basic zinc compound and a basic aluminum compound, dissolved together in a ratio between 1 to 2 and 1 to 3 with an excess of caustic soda in solution, capable of being added in the form of a mixture.

2. A product for treating water comprising a mixture of zinc oxide, aluminum hydroxide and caustic soda, capable of being added in the form of a mixture, the aluminum hydroxide forming approximately one-third of the mixture by weight, the zinc oxide and caustic soda each being present in excess of 10% of the mixture by weight.

3. A process for treating water comprising the solution of substantial quantities of zinc salts and aluminum salts in a strongly alkaline liquor, sharply reducing the alkalinity of the solution by adding it to a relatively large quantity of water to be treated, the zinc salts equalling by weight not more than one-third of the weight of the aluminum salts, whereby to form in the water a flocculent precipitate comprising substantial quantities of zinc and aluminum.

4. A clarifying agent for treating turbid water comprising essentially a mixture of a basic zinc compound and basic aluminum compound together with an excess of caustic soda, each of the compounds being in excess of five per cent of the mixture of said compounds by weight.

5. A process for treating water comprising the formation in the water being treated of a flocculent precipitate comprising the reaction product resulting from sharply increasing the pH of a strongly alkaline solution containing basic zinc and aluminum compounds approximately in the ratio of 1 to 3.

6. A product for treating water comprising 16% by weight of aluminum hydroxide, 6% by weight of zinc oxide, 26% by weight of alkali and 51% by weight of water.

7. A product for treating water comprising not more than 20% and not less than 10% by weight of aluminum hydroxide, not more than 10% and not less than 3% by weight of zinc oxide, not more than 30% and not less than 20% by weight of caustic soda, and not more than 60% and not less than 40% by weight of water.

SYDNEY P. FOSTER.
GEORGE H. SILL.